United States Patent [19]

Moneghan

[11] 4,003,498

[45] Jan. 18, 1977

[54] METHOD AND APPARATUS FOR CONTROLLED FEEDING OF FRICTION MATERIAL

[75] Inventor: Edward Moneghan, Hatboro, Pa.

[73] Assignee: Pennwalt Corporation, Philadelphia, Pa.

[22] Filed: Dec. 5, 1975

[21] Appl. No.: 637,914

Related U.S. Application Data

[62] Division of Ser. No. 633,054, Nov. 18, 1975.

[52] U.S. Cl. .................................. 222/1; 198/526; 222/56; 222/70; 222/227; 425/147; 425/205
[51] Int. Cl.² ...................... B29F 3/02; B29C 3/00
[58] Field of Search ............. 198/47, 69, 213, 526; 425/147, 156, 205; 222/227, 236, 241, 242, 254, 56, 70, 1

[56] References Cited

UNITED STATES PATENTS

| | | | |
|---|---|---|---|
| 2,674,396 | 4/1954 | Peterson | 222/227 X |
| 3,225,963 | 12/1965 | Arpajian | 222/56 X |
| 3,308,994 | 3/1967 | Rohn | 222/227 X |
| 3,920,229 | 11/1975 | Piggott | 425/205 X |

FOREIGN PATENTS OR APPLICATIONS 1,392,175  4/1975  United Kingdom .............. 425/205

Primary Examiner—Robert B. Reeves
Assistant Examiner—David A. Scherbel
Attorney, Agent, or Firm—Charles N. Quinn

[57] ABSTRACT

A novel method and an improved combination of apparatus are provided for controlled feeding of dry friction and other high bulk materials along a closed path, whereby release of dust particles of the friction or other high bulk material is substantially eliminated. The method and apparatus are particularly suited to feeding the dry material from a remote storage container along a closed path and into contact with a rotatable screw for at least partially plasticizing the dry material in preparation for compression molding thereof. Also provided is apparatus for molding rigid structures from dry friction material, having as a portion thereof the improved apparatus for feeding friction material.

14 Claims, 6 Drawing Figures

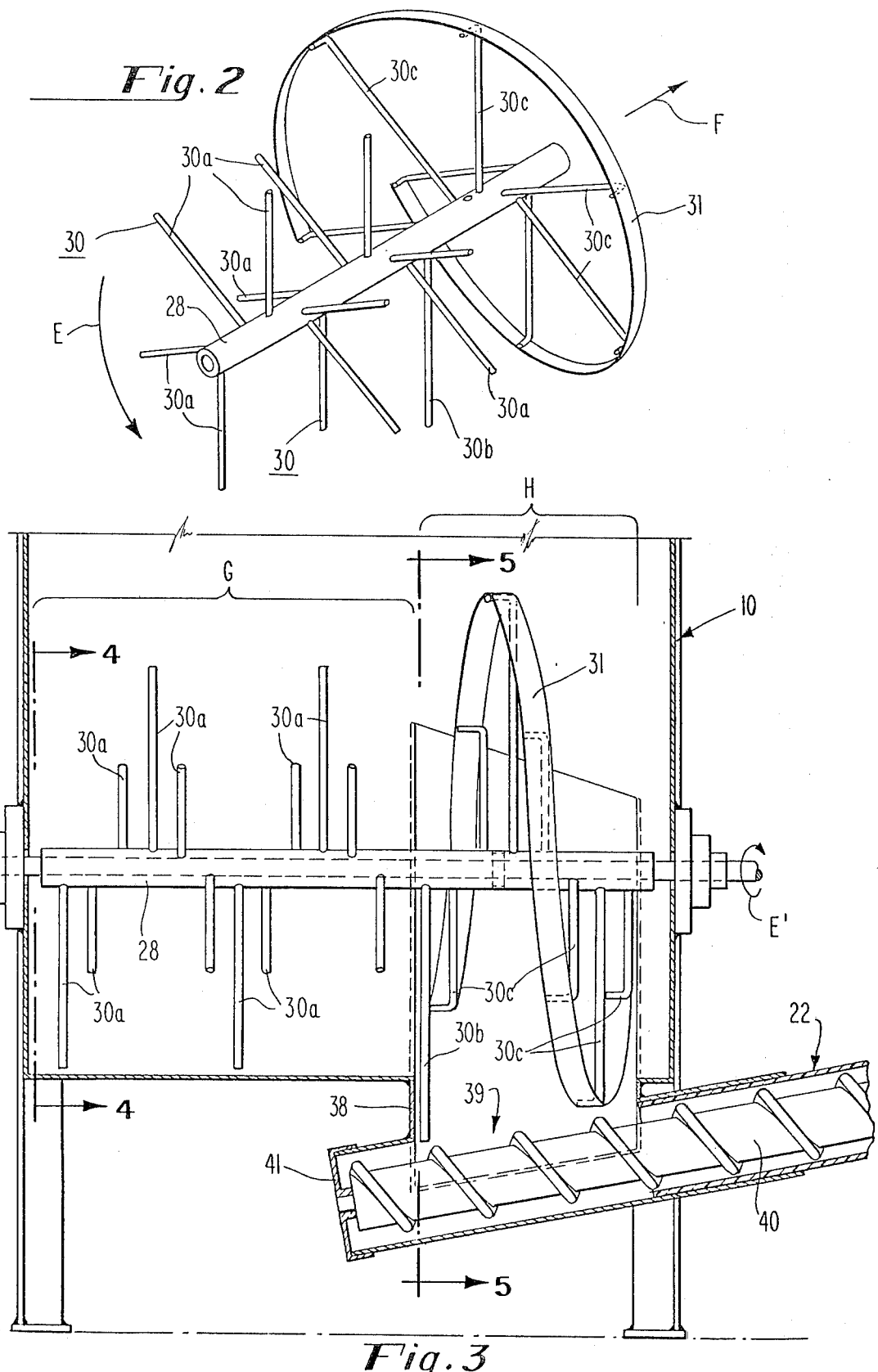

METHOD AND APPARATUS FOR CONTROLLED FEEDING OF FRICTION MATERIAL

CROSS REFERENCE TO RELATED PATENT APPLICATION

This patent application is a division of copending United States patent application Ser. No. 633,054, entitled "Improved Method for Forming Solid Friction Material Structures," filed Nov. 18, 1975 by Edward Moneghan and assigned to Pennwalt Corporation.

BACKGROUND OF THE INVENTION

Field of the Invention

This invention relates to apparatus for forming dry, high bulk, friction materials into rigid structures which are substantially immediately useable in applications requiring friction resistant structures without further modification. More particularly, this invention relates to an improved method and apparatus for feeding friction material prior to compression molding the friction material to form brake shoes, disk brake pads, brake blocks and the like.

SUMMARY OF THE INVENTION

Heretofore it has not been known to provide in combination with apparatus for compression molding rigid friction material structures of the type set forth, apparatus and a method for progressively withdrawing mixed friction material from a remotely located supply and feeding it to a plasticizing screw along a closed path. Also unique is a hopper with an agitator therein, suitable for progressive withdrawal of mixed friction material therefrom while agitating at least a portion of the remaining material. Further provided is apparatus, preferably a closed flexible auger, for progressively transporting the withdrawn friction material along a closed path to the plasticizing screw.

BRIEF DESCRIPTION OF THE DRAWINGS

FIG. 2 is an enlarged isometric view of a rotatable horizontal shaft removed from the agitator portion of the apparatus of FIG. 1.

FIG. 3 is an enlarged, vertical side sectional view of the agitator portion of the apparatus of FIG. 1, with internal parts shown in elevation.

DESCRIPTION OF THE PREFERRED EMBODIMENTS

Figure 1:
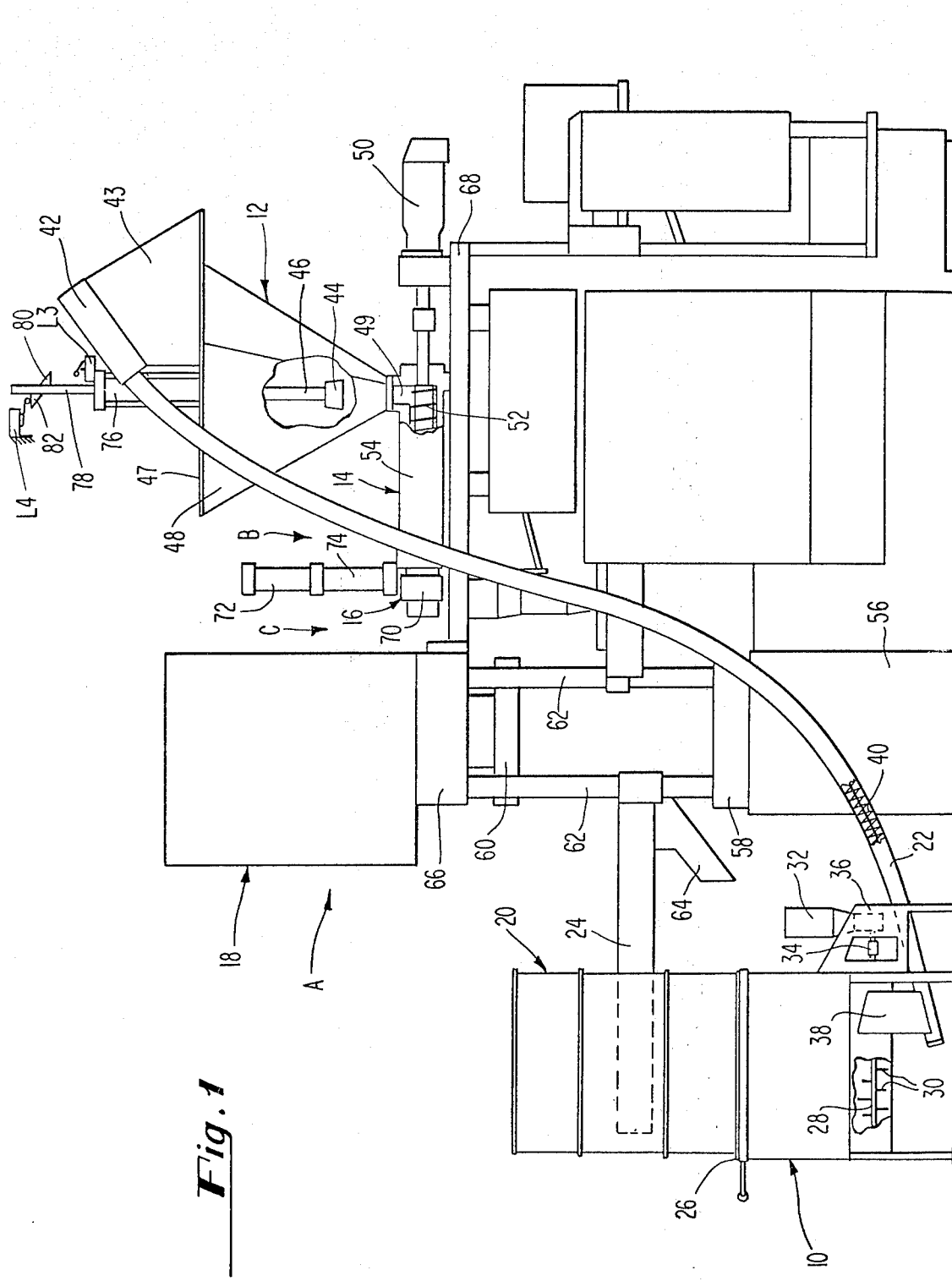
FIG. 1 is a side view of the preferred embodiment of the improved combination of apparatus of the present invention.

Reference is made to FIG. 1 wherein there is shown the preferred embodiment of novel combination of apparatus for compression molding rigid bodies from friction material. Container 20 containing the friction material recipe is preferably mounted atop agitator 10 for release thereinto of friction material. Agitator 10 is connected to stuffer hopper 48 of a stuffer assembly 12 by feed means 22 through which the agitated mix of friction material recipe is transferred to stuffer hopper 48. Stuffer hopper 48 is mounted atop extruder portion 14 for delivery of mixed friction material recipe thereinto. Extruder 14 has preforming means 16 affixed proximate to one end thereof for the receipt of partially plasticized friction material. Compression molding press 18 molds the friction material preforms into the final molded product.

Container 20 is preferably adapted for mounting on top of agitator 10 for direct and closed transfer of friction material recipe into agitator 10, without release of any dust or fine particulate matter from the friction material into the atmosphere. Container 20 is retained atop agitator 10 as required by any suitable connecting means. Sealing means 26 may be provided at the juncture of container 20 and agitator 10 in order to assure that no dust or fine particulate friction material escapes into the atmosphere during transfer of the mixture from container 20 to the agitator 10. A suitable cover (not shown) may be used in place of sealing means 26 to close the open top of the agitator after the container is empty.

Agitator 10 has disposed therewithin a horizontal shaft 28 which has a plurality of fingers 30 extending radially and perpendicularly therefrom. Horizontal shaft 28 is driven by motor 32, which is preferably an electric motor, through gear reduction means enclosed within housing 36. In FIG. 1, agitator 10 has been broken away to show horizontal shaft 28 and several of the attached fingers 30. Agitator 10 has extending downwardly therefrom a duct 38 for guiding the mixed and agitated friction material recipe contained in the agitator 10 into feed means in the form of a flexible feeder 22. Flexible feeder 22 has therein a flexible, continuous screw 40 of the auger type.

Flexible screw 40 is driven by a preferably hydraulic motor 42 which, in the embodiment shown in FIG. 1, is mounted at an end of flexible screw 40 remote from agitator 10. It is to be understood that hydraulic motor 42 could equally well be mounted at the end of flexible screw 40 proximate to agitator 10. Hydraulic motor 42 is mounted on a mounting bracket 43 which in turn is affixed to stuffer hopper 48. Bracket 43, in addition to supporting hydraulic motor 42, is constructed in such a way that it encloses the end of flexible screw 40 from which transported friction material drops into stuffer hopper 48. A cover 47 covers the top of stuffer hopper 48 so that no friction material can escape to the air as it drops into stuffer hopper 48. Stuffer hopper 48 has been partially broken away in FIG. 1 in order to show a plunger 44 secured to the lower end of an upright, vertical shaft 46 for unitary motion therewith. The plunger 44 and the shaft 46 reciprocate vertically, thereby serving to stuff friction material in the downwardly tapered stuffer hopper 48 through an orifice 49 at the lower end thereof into contact with rotatable plasticizing screw 52. The plunger 44 and the shaft 46 are driven by an air cylinder 76 located above stuffer hopper 48.

The plasticizing portion of the apparatus has been designated generally by arrow B and comprises plasticizing screw 52 mounted for rotational motion within plasticizing screw housing 54. Plasticizing screw 52 is driven by a hydraulic motor 50. The screw 52, housing 54 and motor 50 comprise an assembly providing an extruder 14. The extruder 14 is mounted on a bed plate 68.

At least one preform cup 70 is moveably disposed at the end of plasticizing screw 52 for receipt therein of at least partially plasticized material exiting from an orifice at the end of plasticizing screw housing 54. An air cylinder 72 is disposed above the juncture of cup 70 and housing 54. A housing 74 encloses a guillotine knife (not shown) which is driven by the air cylinder 72 from its retracted position downwardly to a position between the preform cup and the plasticizing screw housing. This assembly is referred to as the preforming section.

Reference is now made to the molding press 18 shown in FIG. 1. The press 18 has a base 56 upon which stationary platen 58 is mounted. Disposed above stationary platen 58 on connecting guide posts 62 is a moveable platen 60. Mold halves, which are not shown, are disposed on the two platens. It is in the mold cavities defined by these mold halves that the rigid friction material bodies are formed when preforms of fricton material are placed into the respective mold cavities, the mold halves are brought together, and heat and pressure are applied. Duct 64 is provided, preferably adjustably affixed to one of guide posts 62, for transferring the molded rigid friction material bodies away from the press once molding is complete. A hydraulic cylinder contained in hydraulic cylinder enclosure 66 provides for vertical movement of moveable platen 60.

Extending upwardly in a vertical direction from a reciprocable piston contained in air cylinder 76, is rod 78, which has selectively adjustable upper and lower cam means 82 and 80 affixed thereto for unitary movement therewith. Upper cam means 82 actuates an upper limit switch L4, while lower cam means 80 actuates a lower limit switch L3. Upper and lower limit switches L4 and L3 are momentarily actuated while engaged by their respective, associated cam means during reciprocation of rod 78.

Reference is now made to FIGS. 2 and 3 wherein the horizontal shaft 28 of the agitator 10 is shown with a plurality of fingers 30, also denoted 30a, 30b and 30c protruding therefrom in a radial direction, with ribbon 31 helically formed about and affixed to the extremities of fingers 30c. Within agitator 10 horizontal shaft 28 rotates in the direction shown by arrow E. Radially extending fingers 30a and radially extending finger 30b serve to continuously agitate and mix the friction material in agitator 10. The fingers 30c, are each of different length. The radially extending fingers 30c are arranged extending from horizontal shaft 28 in order of decreasing length as one moves in the axial direction denoted by arrow F. Due to the helical shape of ribbon 31, as horizontal shaft 28 is rotated through the friction material present in agitator 10, friction material in the neighborhood H of helical ribbon 31 will be urged in the direction denoted by arrow F. Friction material remote from the helical ribbon, proximate to fingers 30a, will then move in the direction denoted by arrow F, to fill the void created when the material more proximate to ribbon 31 has dropped through duct 38 into the inlet 39 of the feeder 22 for removal by flexible screw 40.

Feeder 22 is provided with end sealing means 41 to close the lower end of flexible feeder 22 so that no dust or friction material can escape therefrom. In the area of agitator 10 along horizontal shaft 28 denoted by bracket G, equal length fingers 30a serve to agitate the friction material and maintain it in a light, homogeneous condition. In the area denoted by bracket H, extended length finger 30b in combination with the plurality of fingers 30c serve to draw friction material from the area denoted by bracket G into the area denoted by bracket H.

Figure 4:
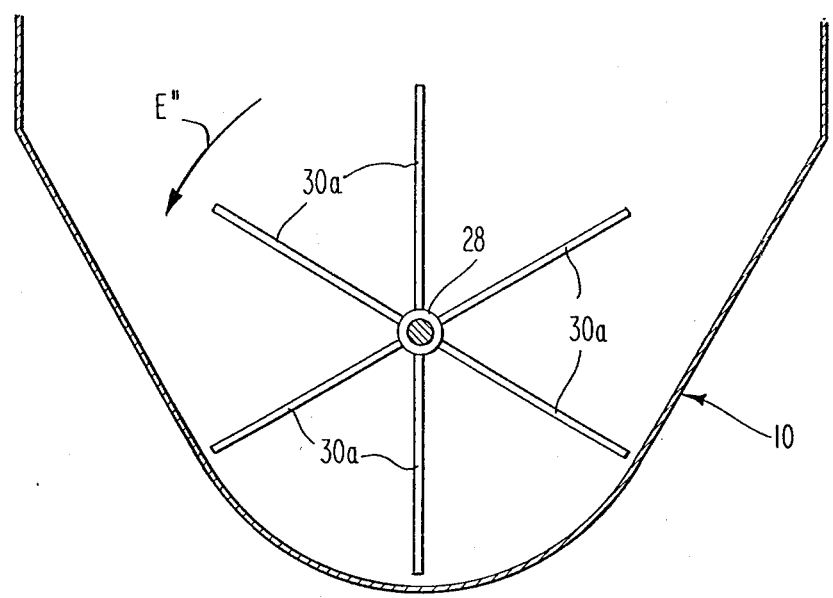
FIG. 4 is a vertical sectional view of the agitator portion of the apparatus of FIG. 1, taken along the line 4—4 in FIG. 3.

Reference is now made to FIG. 4 wherein there is shown an end view of horizontal shaft 28 with six equal length fingers 30a extending radially therefrom. It should be noted that the fingers 30a are closely spaced to the wall of agitator 10 to maintain substantially all the friction material in agitator 10 in an agiatated, fluffed, homogeneous state. The direction of rotation of horizontal shaft 28 is denoted by arrow E''.

Figure 5:
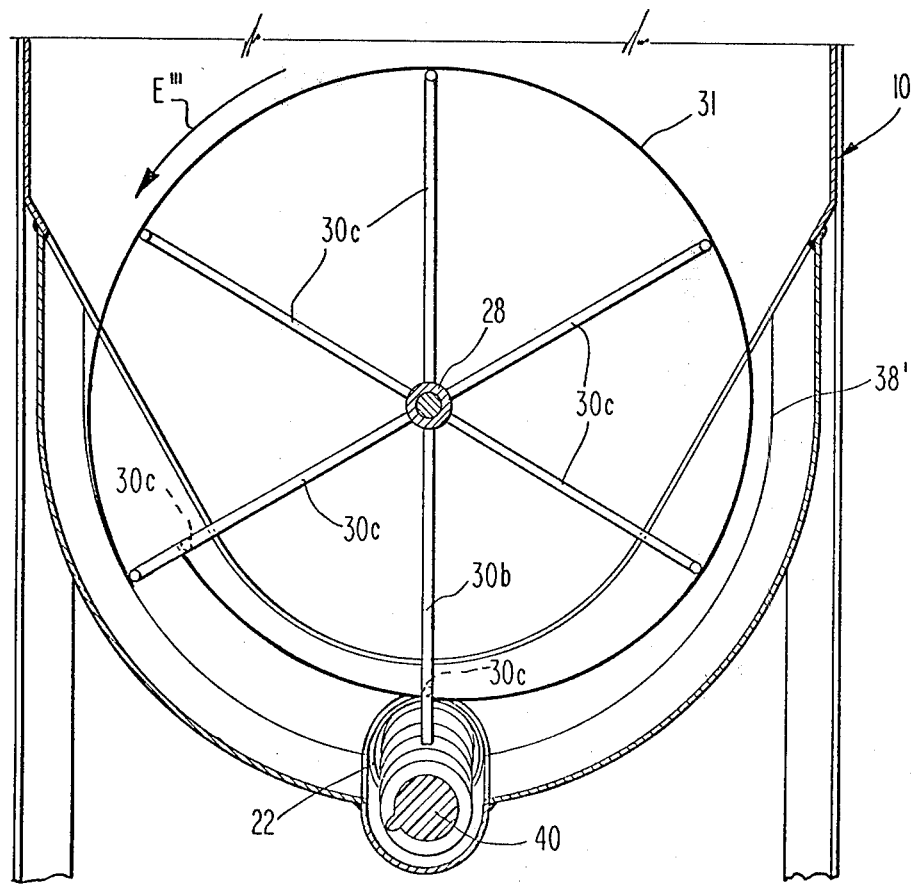
FIG. 5 is another vertical sectional view of the agitator portion of the apparatus of FIG. 1, taken along the line 5—5 in FIG. 3.

Reference is now made to FIG. 5 which is another sectional view taken through agitator 10 showing horizontal shaft 28 and the fingers 30c whose ends form the helical path for helical ribbon 31. In FIG. 5, the direction of rotation of horizontal shaft 28 is shown by arrow E'''. The projection of the edge of the duct 38 is denoted as 38'. As shaft 28 rotates in the direction shown, a corkscrew-type action by helical ribbon 31 upon the agitated homogeneous friction material in agitator 10 will result in the friction material gathering together in the neighborhood of helical ribbon 31. Due to this action and the force of gravity, friction material will fall downward into proximity with flexible screw 40 which will remove the friction material from agitator 10 along a closed path.

Figure 6:
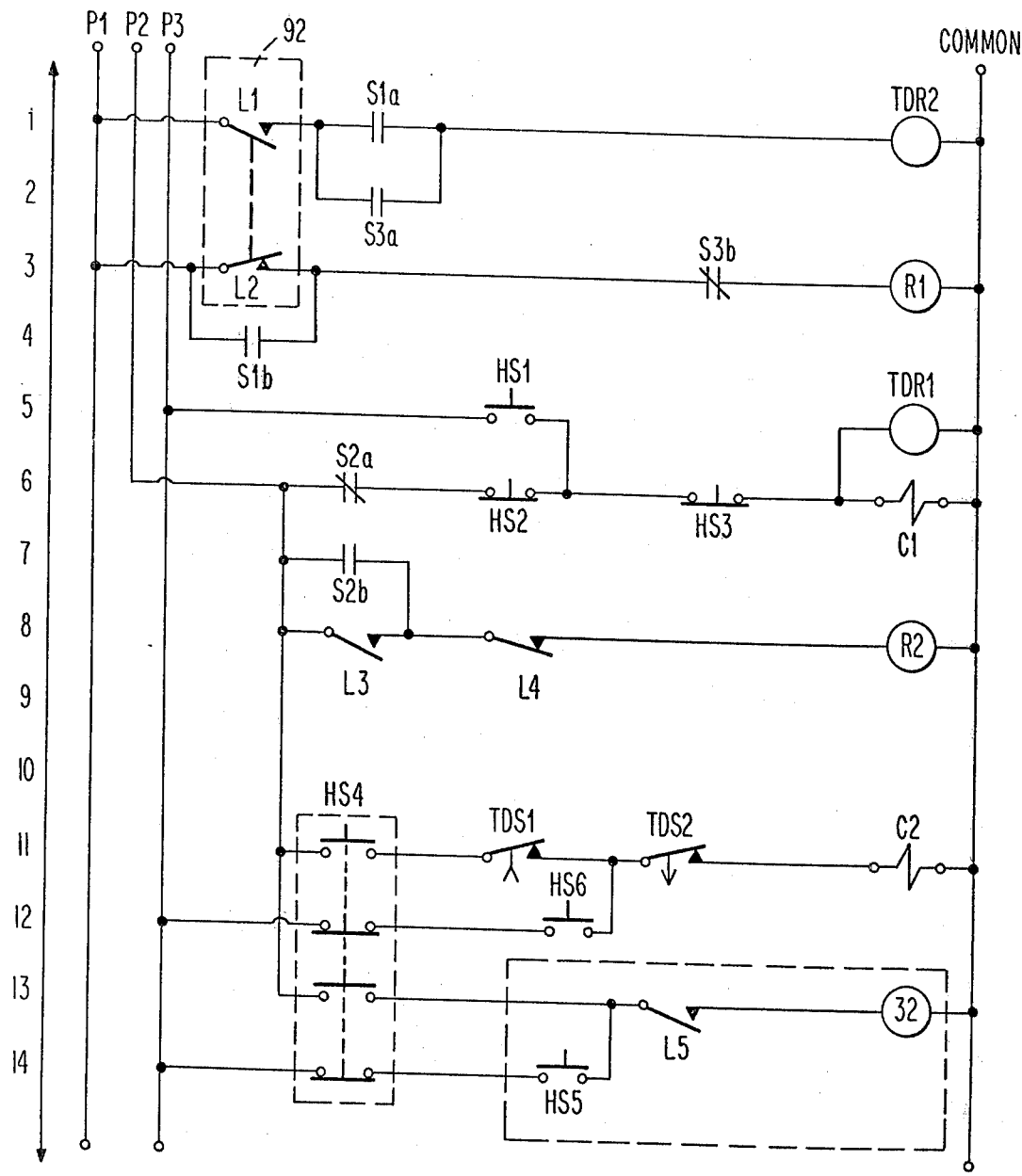
FIG. 6 is a schematic diagram of the electrical circuit which facilitates the method of the present invention.

Reference is now made to FIG. 6 which is a diagram of electrical circuitry of the present invention which controls the feeding of friction material from agitator 10 into stuffer hopper 48. The lines designated P1 and COMMON are the main electrical power lines. Switch L5 controls motor 32 and provides an electrical interlock whereby when agitator 10 is open, no mixing of friction material can take place. Line P2 provides power to the circuit elements when the apparatus of the present invention is feeding friction material in an automatic mode, to be described below. Line P2 is connected in parallel with electrical circuitry controlling plasticizing screw hydraulic drive motor 50 so that automatic feeding of friction material cannot occur unless plasticizing screw 52 is rotating. Line P3 provides power for operating portions of the present invention to feed friction material in a manual operating mode. Power to Line P3 is controlled by a manual switch not shown in the diagram.

Element 92 is a material level sensing means in stuffer hopper 48. Upper and lower limit switches L1 and L2 are mechanically tied and are actuated by the presence of friction material in stuffer hopper 48. S1a is a pair of normally open contact points actuated by relay R1 while S3a is a pair of normally open contact points actuated by a time delay relay TDR2; S1a and S3a provide a holding circuit for TDR2. TDR2 is an "off time delay relay; " when TDR2 is energized, it immediately opens normally closed switch TDS2. The timer portion of TDR2 begins to time only when TDR2 is deenergized. Once the timer portion of TDR2 has timed out, TDS2 closes. The timing function of TDR2 does not affect conventional relay contact points S3a or S3b, both actuated by TDR2. Contact points S3a are normally open and close when TDR2 is energized while contact points S3b are normally closed and open when TDR2 is energized. The timing function to DTR2 is adjustable so the time TDS2 remains open after TDR2 has been deenergized can be varied.

S1b is a pair or normally open contact points actuated by relay R1; S1b provides a holding circuit for R1.

HS1, HS2 and HS3 are hand-actuated switches which are respectively normally open, normally closed and normally closed. These three switches allow hand control of TDR1 and C1. TDR1 is an "on time delay relay" with timing starting when TDR1 is energized. TDR1 opens normally closed pair of contact points TDS1 when it has timed out. Once deenergized, TDR1 allows points TDS1 to return to their normally closed position. Coil C1 controls air cylinder 76. When C1 is energized, air is supplied to cylinder 76 by opening a conventional valve thereby allowing compressed air to enter cylinder 76, causing a downward stroke of reciprocating plunger 44 and vertical rod 78. When C1 is de-energized, reciprocating plunger 44 and vertical rod 78 are returned to their starting position, where the downward stroke begins.

S2a and S2b respectively are normally closed and normally open pairs of contact points actuated by relay R2. L3 and L4 are the lower and upper limit switches actuated by lower and upper adjustable cam means 80 and 82 respectively. L3 is normally open and is closed only during contact with adjustable cam means 80; this contact defines the maximum downward travel of plunger 44. L4 is normally closed and is opened by adjustable cam means 82 at the maximum upward travel of plunger 44.

HS4 is a hand switch with four sets of contact points, two of which are normally opened and two of which are normally closed. Hand actuation of HS4 changes operation of the feeding system from the manual to the automatic mode. HS6 is a hand switch for manual operation of hydraulic motor 42 which powers flexible screw 40. Coil C2 when energized actuates a conventional hydraulic valve which controls the flow of hydraulic fluid to hydraulic motor 42. HS5 is a normally open hand actuated switch.

OPERATION OF THE INVENTION

One subcombination of the apparatus of the present invention provides a closed system for closely controlled automatic meter feeding of friction materials and other high bulk thermoset materials from a remote closed agitator into a means for plasticizing or extruding the material.

A key feature is the characteristic of automatically feeding the friction or other high bulk material at a controlled rate to the plasticizing screw 52 in FIG. 1, while keeping the friction or other high bulk material confined so that it will not escape to surrounding ambient air thereby contaminating surrounding ambient air and making the work area unsuitable for workers.

Feeding the material is initially accomplished by feeding material in remote agitator hopper 10 into spiral tubular material conveyor or flexible screw 40 through duct 38. As horizontal shaft 28 with fingers 30 rotates, it tends to keep the material in the agitator hopper agitated thereby preventing the material from bridging above the pick-up area of flexible screw 40. Agitation of the material by rotation of horizontal shaft 28 also acts to force the material in the agitator hopper from left to right in FIG. 1 into duct area 38.

The spiral tubular material conveyor or flexible screw 40 is rotaionally driven by hydraulic motor 42 and feeds the friction or high bulk material from duct 38 of agitator hopper 10, through flexible feeder 22, along a spiral path into stuffer hopper 48.

Once the friction or other high bulk material has been discharged into stuffer hopper 48, the material is then force-fed through orifice 49 into contact with plasticizing screw 52. This feeding is accomplished by reciprocating plunger 44 with air cylinder 76.

Horizontal shaft 28 and fingers 30 associated therewith in agitator hopper 10, flexible screw 40, stuffer hopper 48 and its associated reciprocating plunger 44 function to feed the friction or high bulk material to plasticizing screw 52, through a closed system, at a suitable rate for operation of plasticizing screw 52. Accordingly, operation of horizontal shaft 28, flexible screw 40 and reciprocating plunger 44 must be coordinated so that all these elements act as one system to properly feed plasticizing screw 52. In order for plasticizing or extruding screw 52 to properly function, it must receive the friction or high bulk material at the same rate at which screw 52 can carry the friction or high bulk material away from orifice 49 through plasticizing screw housing 54 for deposit into a preform cup 70. Since friction and other high bulk materials are not free-flowing, these materials will "bridge" across orifice 49 thereby preventing plasticizing or extruding screw 52 from receiving any material. One function of reciprocating plunger 44 is to break up any bridging of material which occurs above orifice 49 and to stuff material down orifice 49 into contact with plasticizing screw 52. In this way, there is assurance that plasticizing screw 52 is receiving the friction or other high bulk material at least as fast as plasticizing screw 52 can remove material from orifice 49 by rotation.

For reciprocating plunger 44 to properly function, the rate at which friction material is fed into stuffer hopper 48 must be precisely controlled. This feed must be equal to the rate at which plasticizing screw 52 removes friction material from orifice 49. If the amount of material fed into stuffer hopper 48 is too small, too little material will move through plasticizing screw barrel 54, causing the material in barrel 54 to become too hot. This is unacceptable since the temperature of the material reaching preform cup 70 must be controlled to a close tolerance. If the temperature is too high, too much curing of the thermoset resin portion of the material will occur, making the molding of acceptable parts in press 18 impossible. If too much material is fed into stuffer hopper 48, the material will build up therein because plasticizing screw 52 will be unable to remove it quickly enough from orifice 49. This also is unacceptable because of the characteristic of friction or high bulk material whereby the material will not flow vertically when such build-up begins. Reciprocating plunger 44 makes only a hole through the built-up material and the built up walls of material do not collapse, an effect called "rat-holing." The result again is that any material in plasticizing screw barrel 54 overheats because insufficient material is present therein.

For controlling the rate of feed of friction material to the plasticizing screw, three controls are provided. A first control is a valve means for controlling the rate of hydraulic fluid flow in the hydraulic fluid line connected to hydraulic motor 42. This flow control is conventional, is preferably hand operated and is not shown in the drawings. It is preset for a given type of material which is fed into stuffer hopper 48. Normally once a proper setting is determined for this flow control, for a given type of material which is being fed, the flow control need not be further adjusted. This flow control provides means for adjusting the speed of hydraulic motor 42 thereby adjusting the speed at which flexible screw 40 rotates. The speed at which flexible screw 40 rotates controls the rate of feed of the friction mateial into stuffer hopper 48. Unfortunately, due to the nature of friction and other high bulk materials, with their inconsistent, nonhomogenous make-up, a constant rate of feed of friction or other high bulk material into stuffer hopper 48 will not permit the degree of control of the amount of friction material in hopper 48 which is required for successful operation of the reciprocating plunger 44. Accordingly, a second control is needed.

The second control is a time control preferably consisting of first time delay relay TDR1 controlling coil C2 which activates a conventional input electrical circuit, not shown, which serves to actuate a conventional hydraulic valve, not shown, which controls fluid flow to hydraulic motor 42. First time delay relay TDR1 is actuated when reciprocating plunger 44 starts its downward stroke. Time delay relay TDR1 has associated therewith a preset time upon the elapse of which, after actuation of TDR1, TDR1 is said to "time-out." When TDR1 times out, it opens TDS1 in the input circuit to coil C2 thereby closing the hydraulic valve, denying hydraulic fluid to the hydraulic motor 42 thereby stopping rotation of the flexible screw 40 and haulting feeding of friction material into stuffer hopper 48. TDR1 is preferably adjustable so that it can be set to a suitable time whereupon it will stop any overfeeding of friction material.

A third control used for control of feed rate of the friction material through orifice 49 to plasticizing screw 52 is level sensing means 92 to sense the level of friction material in stuffer hopper 48. Any suitable sensing means may be used to sense this material level. Suitable means include mechanical limit switch type sensing means, wherein a mechanical arm will be deflected upon material in stuffer hopper 48 reaching an excessively high level, shown schematically in FIG. 6. Whatever level sensing means is used, it is connected to electrical circuitry for control of hydraulic fluid to hydraulic motor 42. So long as the level of material is maintained below a critical high level in stuffer hopper 48, reciprocating plunger 44 will successfully stuff material through orifice 49 into proximity with plasticizing screw 52.

The electrical power supply controlling the feed of air to air cylinder 76, the feed of electricity to motor 32 and the feed of hydraulic fluid to hydraulic motor 42 is preferably connected in parallel with the source of electrical power controlling operation of plasticizing screw motor 50. Thus, only when plasticizing screw 50 is operative and rotating will friction material be fed from agitator hopper 10 through flexible feeder 22 into stuffer hopper 48 through orifice 49 and into proximity with plasticizing screw 52.

The level sensing means 92 in stuffer hopper 48 is a safety device which normally functions only in the event of a failure of TDR1. During normal operation TDR1 exclusively will serve to control the operation of air cylinder 76, reciprocating plunger 44 and vertical shaft 46.

During normal automatic operation the sequencing of TDR1 is as follows. Initially, assume plasticizing screw 52 is rotating thereby feeding at least partially plasticized material into preform cup 70. Air cylinder 76 is actuated thereby initiating downward travel of reciprocating plunger 44 and rod 78. Upper adjustable cam means 80, slidably affixed to rod 78, moves downward thereby allowing top limit switch L4 to close which in turn triggers TDR1 by deenergizing R2 thereby allowing S2a to return to the normally closed state. This actuates the timer associated with TDR1. When reciprocating plunger 44 reaches the bottom extremity of its travel, lower adjustable cam means 82 contacts bottom limit switch L3 whichen energizes R2 thereby opening S2a and deenergizing C1 and TDR1. This reverses the air flow into cylinder 76 thus causing reciprocating plunger 44 to rise to its upper extremity where another reciprocation of reciprocating plunger 44 is begun. Note that if TDR1 times out, reciprocating plunger 44 continues its travel, it does not stop upon completion of the preset time. The function of TDR1 is to control operation of hydraulic motor 42, which drives flexible screw 40, not to control operation of reciprocating plunger 44. Either of two events makes the piston in cylinder 76 travel to its upper extremity whereupon it is ready to begin another downward stroke; these two events are (1) stopping the plasticizing screw 52, which means that preform cup 70 is full or (2) allowing reciprocating plunger 44 to reach a lower extremity of travel whereupon lower adjustable cam means 82 actuates bottom limit switch L3. If TDR1 times out during a downward portion of a reciprocation of reciprocating plunger 44, this signifies that friction or high bulk material is well packed below reciprocating plunger 44, filling orifice 49 and in good contact with plasticizing screw 52. If reciprocating plunger 44 is contacting friction material in stuffer hopper 48 when TDR1 times out, reciprocating plunger 44 does not reach a stall condition because plasticizing screw 52 continues to rotate thereby continuously removing material from orifice 49; accordingly reciprocating plunger 44 continues to travel downwardly. If plasticizing screw 52 stops rotating due to shutoff of electrical power, the consequent deenergizing of coil C1 causes reciprocating plunger 44 to return to its extreme top position to begin another downward portion of a reciprocation upon reconnection of electrical power to plasticizing screw 52.

Reference is again made to FIG. 6. When the feeding mechanism of the present invention is operated manually, power is supplied through line P3. Actuation of HS1 energizes C1, thereby causing reciprocation of the piston in air cylinder 76 with consequent reciprocation of plunger 44 and actuation of TDR1. However this actuation of TDR1 need have no effect on operation of the feeding mechanism since TDS 1 may be effectively bypassed by actuation of HS6. Assuming TDS2 is in its normally closed position, actuation of HS6 will actuate C2 which initiates operation of hydraulic motor 42, thereby providing feed of friction material to stuffer hopper 48. Similarly, manual actuation of HS5 energizes electric motor 32 thereby rotating horizontal shaft 28, assuming that L5 is in its closed position, indicating that the cover interlock on agitator 10 is operative.

Note that when operating in the manual mode, level sensing means 92 and TDR2 are both operative from power supplied through line P1. This means that even in the manual operating mode, if stuffer hopper 48 becomes too full of material, TDR2 will be actuated, thereby opening TDS2 and thereby stopping operation of hydraulic motor 42, halting feeding of friction material into stuffer hopper 48. Level sensing means 92 and TDR2 operate in the same fashion when the feeding mechanism is operating in the automatic mode since power is always supplied through line P1 no matter which mode of operation is being used.

Reference is again made to FIG. 6 for consideration of the operation of the circuit of the present invention when the feeding apparatus of the present invention is operating in the preferred automatic feed mode. HS4 is a selector switch which the operator uses to select either the automatic or manual mode of operation. As shown in FIG. 6, HS4 is in position for manual operation. While operating in the automatic mode, HS4 is actuated, from the state shown in FIG. 6, thereby making the circuits in reference lines 11 and 13 and breaking the circuits in reference lines 12 and 14. Referring to reference lines 1, 2, 3, and 4, so long as the level of friction material in stuffer hopper 48 is below that at which L1 is closed, L2 will remain closed, thereby energizing R1 which in turn causes S1a and S1b to be actuated from their normally open positions to closed positions. Upon the material in stuffer hopper 48 reaching the maximum allowable level, L1 will close, thereby opening L2. R1 will remain energized due to closed S1b. Once L1 closes, TDR2 is energized since S1a is closed. Upon TDR2 being energized, S3a closes, S3b opens and TDS2 opens thereby halting feed of friction material by deenergizing coil C2 which controls hydraulic motor 42. TDS2 remains open, thereby preventing the feeding of friction material, until TDR2 has been deenergized, by the level of material in stuffer hopper 48 dropping thereby deactuating L2, and the timer portion of TDR2 has timed out. Both S3a and S3b respectively close and open immediately upon TDR2 energizing since S3a and S3b are not connected to the timing function of TDR2. Once the level of friction material in stuffer hopper 48 has dropped below the maximum allowable level, L1 opens and L2 closes, thereby energizing R1. This closes S1b thereby providing a hold circuit for R1. Upon L1 opening, TDR2 is no longer energized and S3b returns to its normally closed position. TDS2 returns to its normally closed state after the timing function of TDR2 has finished.

TDR1 begins to time when it is energized with C1 which actuates a valve in an air line to cylinder 76. When C1 is energized, the piston in cylinder 76 begins its downward stroke, thereby causing plunger 44 and rod 78 to begin the downward portion of a reciprocation. Accodingly, TDR1 begins to time when plunger 44 starts down. S2a is normally closed and is actuated by R2. When C1 is actuated and the piston in cylinder 76 begins its downward travel, R2 is not energized and S2a is in its normally closed position. L4 is in its normally closed position, having closed immediately upon upper adjustable cam means 82 moving away from L4 upon the downward movement of extended rod-like portion 78. Once the piston in cylinder 76 starts downward, it continues downward until lower adjustable cam means 80 closes normally open L3. This energizes R2 thereby opening S2a and closing S2b. Closure of S2b provides a holding circuit which maintains R2 in the energized state. When S2a opens, C1 is de-energized thereby causing piston in cylinder 76 to travel upwardly from its extreme downward position. TDR1 is also de-energized. The piston in cylinder 76 continues to move upwardly until upper adjustable cam means 82 opens normally closed L4. This de-energizes R2, thereby allowing S2a and S2b to return to their normally closed and normally open states respectively. When S2a closes, C1 is energized and the piston begins another downward stroke. Thus, once driven motor 50 for plasticizing screw 52 is actuated and HS4 is in position for automatic operation, the piston in cylinder 76 will begin to reciprocate.

Clearly, each time the piston in cylinder 76 reciprocates upon actuation of C1, TDR1 is also energized and begins to time. When TDR1 times out, normally closed TDS1 opens thereby de-energizing C2. This stops hydraulic motor 42, halting feeding of friction material into stuffer hopper 48. TDS1 closes when TDR1 is energized again at the start of another downward stroke of the plunger. TDS2 opens upon TDR2 being energized, remains open even while TDR2 is timing after being deenergized and closes only when TDR2 has timed out. As noted above, TDR2 is only actuated when the level sensor 92 senses that friction material has accumulated to the maximum allowable level in stuffer hopper 48. Thus, TDR1 and TDR2 operate together to actuate C2 and control hydraulic motor 42.

This operation is as follows. TDR1 is energized and begins to time each time plunger 44 initiates a downward stroke. If a reciprocation of plunger 44 is completed before TDR1 times out, TDR1 will initiate timing upon the start of the next downward stroke of plunger 44. Energizing TDR1 on a second downward stroke of plunger 44 before TDR1 has timed out from the previous stroke of plunger 44 will cause TDS1 to remain closed. In this condition C2 will remain energized and hydraulic motor 42 will continue to operate screw 40 thereby continuing the feed of friction material into stuffer hopper 48. Once stuffer hopper 48 becomes sufficiently full of material that a downward stroke of plunger 44 is impeded by the presence of the material, to the extent that a full reciprocation of plunger 44 exceeds the time to which the timer portion of TDR1 has been set, TDS1 will open thereby halting feed of material into stuffer hopper 48. In such case, TDS1 will remain open until TDR1 is again energized when plunger 44 has completed its downward stroke and has returned to its extreme upward position. Thus, when so much material has been fed into stuffer hopper 48 that plunger 44 requires an extended time to complete a single reciprocation, the feed of material into stuffer hopper 48 will be halted until plunger 44 has begun another downward reciprocation, thereby stuffing more material through orifice 49.

In the event the level of material in stuffer hopper 48 exceeds the maximum allowable level, thereby closing normally open L1 and energizing TDR2, TDS2 is immediately opened, thereby de-energizing C2, stopping hydraulic motor 42 and halting the feed of friction material into stuffer hopper 48. TDS2 remains open so long as TDR2 is energized, and for the period after TDR2 is deenergized, until TDR2 times out. Only after TDR2 times out will TDS2 close, thereby energizing C2, operating hydraulic motor 42 and thereby feeding more friction material into stuffer hopper 48. TDR2 does not start to time until it is deenergized by L1 opening due to a drop in the level of friction material in stuffer hopper 48. The time interval to which the timer portion of TDR2 is normally set is sufficiently long to allow plunger 44 to perform at least a major portion of one reciprocation. Thus TDS2 once open will not close until the level of friction material in stuffer hopper 48 has dropped below the maximum allowable high level and plunger 44 has forced some of the friction material in stuffer hopper 48 through orifice 49 into contact with plasticizing screw 52. In this way TDR1 and TDR2, by actuating TDS1 and TDS2 respectively, prevent the level of friction material in stuffer hopper 48 from exceedng the maximum allowable level at which rat holing starts to occur and allow plunger 44 to stuff some material through orifice 49 before stuffer hopper 48 is again completely refilled. This is the process of "starve feeding" without which plunger 44 cannot successfully feed friction material through orifice 49 into contact with plasticizing screw 52.

Electric motor 32 driving horizontal rotating shaft 28 runs continuously when the feeding apparatus of the present invention is operating in the automatic mode, so long as normally open L5 is closed by a cover or sealing means 26 at the top portion of agitator 10. Thus, the material in agitator 20 is continuously agitated and mixed without regard to whether any material is being removed from agitator 10 by means of flexible screw 40.

A typical mold, the halves of which are attached to fixed and moveable platens 58 and 60, might have six mold cavities therein. This would require that six preforms be formed for each molding cycle. It has been found that when operating with a single plasticizing screw and preform cup, six preforms can be formed easily during a 90 second mold cycle, while the previous batch of six preforms is being molded. It is to be understood that the present invention is not limited in terms of the number of preforms which are formed per mold cavity nor is it limited to any particular number of preforms which must be accumulated before loading the molds. The number of preforms formed for each mold cavity and the number of cavities loaded with preforms for each cycle of the molding press 18 can be varied, depending on the end product which is being manufactured and the operating characteristics of the equipment which is utilized without affecting the scope of the present invention.

The molded rigid friction material bodies are ejected from the molding press 18 by suitable means at the termination of each cycle of the molding press. . The friction material bodies fall through duct 64 and may be caught in any suitable container for movement to curing ovens. It is not necessary that the molded friction material bodies be reoriented in the containers before being placed into the ovens.

It is to be understood that even though the invention described herein concerns a method and apparatus which are specifically applicable to feeding friction material for the production of disk brake pads for automobiles and brake blocks for trucks and railroad rolling stock, the present invention has applicability to the feeding friction and other lofty and high bulk materials for the production of other rigid or semi-rigid bodies.

The objects of the present invention have been fully and completely met by the apparatus and methods described herein. Preferred embodiments have been shown for the apparatus. The preferred embodiments for the apparatus and method have been described for the purpose of illustrating the function and structure of the present invention. However, the present invention is not to be deemed to be limited to the embodiments described herein. This invention includes all embodiments and modifications which are encompassed within the scope of the claims appended hereto.

I claim the following:

1. In apparatus for molding rigid bodies from a fluffy material having:
    a. a closed conveyor for conveying said material from a supply container to a hopper;
    b. a reciprocable plunger for feeding said material from said hopper through an orifice to a plasticizing screw, the plunger by compression stroke movement thereof compressing said material delivered through said orifice;

that improvement of:
    c. a control for said conveyor comprising:
    d. a first device for producing a first signal related to the time duration of compression stroke movement of said plunger toward said orifice; and
    e. means operatively associated with said first device for comparing said first signal with a second signal and being responsive to a comparison between said first and second signals for governing the operation of said conveyor.

2. The improved apparatus of claim 1 wherein said control for said conveyor further comprises a feed control for said conveyor, wherein said first device is a time control for comparing the time duration of compression stroke movement of said plunger toward said orifice with a preset reference time interval and wherein said means for comparing further comprises means operatively associated with said time control responsive to the duration of stroke movement for interrupting the operation of said conveyor.

3. Apparatus according to claim 1 wherein said conveyor includes drive means, and wherein said means of element (e) is also operatively associated with said drive means for governing operation thereof in order to govern operation of said conveyor.

4. Apparatus according to claim 3 wherein the drive means is a variable speed drive means, and further including third means employed for selectively adjusting the speed of said drive means.

5. Apparatus according to claim 4 further including level sensing means operatively associated with said hopper responsive to a level of said material in said hopper above a predetermined level for interrupting the operation of said conveyor.

6. Apparatus according to claim 5 wherein said level sensing means is also responsive to a level of said material in said hopper below a second predetermined level for maintaining operation of said conveyor.

7. Apparatus according to claim 5 further including a time delay control operatively associated with said conveyor and responsive to interruption of said conveyor by said level sensing means for delaying the restart of said conveyor for a predetermined time period.

8. A method for feeding high bulk friction materials and the like into contact with a rotating plasticizing screw comprising the steps of:
    a. forcing material from a storage hopper through an orifice and into contact with said screw;
    b. timing at least a portion of the preceding step (a);
    c. transporting material from a supply container, remote from said screw, to said storage hopper; and
    d. regulating the transport of material performed in preceding step (c) whenever the timed portion of step (a) timed in step (b) exceeds a first predetermined time period.

9. The method of claim 8 wherein step (d) further comprises interrupting performance of the preceeding step (c) whenever the timed portion of step (a) timed in step (b) exceeds a first predetermined time period.

10. The method of claim 8 further comprising the step of mixing said material at said supply container.

11. The method of claim 10 further comprising the step of continuously mixing said material at said supply container.

12. The method of claim 8 wherein step (a) further comprises the sub-steps of:
   i. moving a reciprocable means downwardly from an adjustably predetermined extreme upward position;
   ii. contacting any material in the downward path of said reciprocable means, thereby forcing at least the contacted material through said orifice and into contact with said screw; and
   iii. continuing downward movement of said reciprocable means until an adjustably predetermined extreme downward position is reached;

and said method further including the step of
   e. moving said reciprocable means upwardly until said adjustably predetermined extreme upward position is reached.

13. The method of claim 12 further comprising the steps of:
   f. continuously sensing the level of material in said storage hopper; and
   g. halting transport of material to said storage hopper whenver said sensed level of material exceeds a predetermined maximum level.

14. The method of claim 13 wherein step (g) further includes the step of:
   a. interrupting transport of material to said storage hopper whenever said sensed level of material exceeds a predetermined maximum level until said sensed level is less than said predetermined maximum level and until a second predetermined time period has elapsed after said sensed level has become less than said predetermined maximum level.

* * * * *